United States Patent Office 3,395,033
Patented July 30, 1968

3,395,033
LIGNIN BASE ALKALI-DISPERSIBLE ADHESIVE
Robert K. Remer, Evanston, Ill., assignor to Inca Inks Inc., Evanston, Ill., a corporation of Illinois
No Drawing. Continuation-in-part of application Ser. No. 251,006, Jan. 14, 1963. This application Apr. 11, 1966, Ser. No. 541,542
3 Claims. (Cl. 106—123)

ABSTRACT OF THE DISCLOSURE

An adhesive composition which includes a lignin such as, for example, natural lignin polymers obtained from waste alkalli and sulfite lignin liquors, a viscosity reducer such as, for example, dicyandiamide, a solvent such as, for example, water, and an adhesive agent such as, for example, hydroxyethyl cellulose, carboxymethyl cellulose, dextrin, collagen, vegetable proteins, alkali soluble phenol resins, fossil resins, polyamide resins, polyvinyl acetate, natural rubber latex and the like.

---

This application is a continuation-in-part of my copending application entitled, "Inks, Pigments, and Adhesive Coatings," Ser. No. 251,006, filed Jan. 14, 1963, now abandoned.

The present invention relates to new and useful lignin base adhesives and to their use with paper. More particularly this invention is concerned with novel and unobvious lignin base compositions which are specifically adapted for use as adhesives with paper and like cellulosic materials. This invention is also concerned with an improved method of applying these adhesives to a web or substrate surface by printing techniques and with unique molten metal dipping techniques which can be advantageously employed to activate heat sensitive adhesives.

The adhesive compositions of the present invention generally include a suitable lignin (such as natural lignin polymers obtained from waste alkali and sulfite lignin liquors of the pulp and paper industry) together with a suitable solvent (i.e. water, methanol, ethanol, etc.) a suitable fluidizer or viscosity reducer (dicyandiamide, sodium X-napthalene sulfonic acid, etc.) and, an adhesive agent, which cooperates with the lignin to provide unique adhesive properties, more fully described below, which are specifically suitable for use with paper cardboard, and like cellulosic materials.

Examples of these adhesive agents which can be used in the lignin base compositions of the present invention are hydroxyethyl cellulose, carboxymethyl cellulose, dextrin, collagen, vegetable proteins, alkali soluble phenol resins, fossil resins, polyamide resins, polyvinyl acetate (PVA), natural rubber latex and like materials which, when combined with lignin, cooperate therewith to provide an over-all adhesive composition exhibiting similar properties and characteristics.

The products and the methods of the invention are particularly useful in the book binding, packaging and in other fields. In this connection, the present invention finds advantageous utility in printing upon cellulosic products, especially upon lightweight stock having a basic weight of about 15 to about 20 pounds, that is, stock of the type used in the printing of telephone directories and catalogs.

It is an important feature of the present invention that the adhesives possess and exhibit the unique property of bonding to the paper stock or other cellulosic type substrate not only by physical association, but also through chemical forces. The adhesives of the invention bond firmly and intimately to the paper to which they are applied without the undesirable usual penetration of these materials into the body of the paper itself. These important properties of firm bonding and minimum penetration give rise to greatly improved bound books and catalogs. An additional advantage derived from the properties of the products of the invention is that the ultimate removal of the adhesives during reclamation processes is greatly facilitated and high grade recovered cellulosic products are readily obtained. Another important feature of the invention, as will be explained more fully hereinafter, is that these adhesives are alkali dispersible.

It is a noteworthy feature of the lignin base adhesives of the invention and one of considerable economic significance that the lignin raw materials used in preparing the products of the invention are available in large quantities at low cost. Waste sulfite lignins, alkali lignin liquors, and products derived from spent sulfite liquor yeast culture preparations may be used.

While the function and cooperative action of each of the constituents of the lignin base adhesive composition is not precisely known, it is believed that that lignin constituent provides advantageous hydrogen bonding to the paper substrate. In addition, it is believed that the adhesive agent either chemically and/or physically bonds to the lignin molecules so that these two constituents together provide a cooperative action which is more than the cumulative result of their individual action. In this regard, it is important to note that the lignin constituent also functions in the adhesive composition as a dispersant and as an extender.

In accordance with the practice of the present invention, waste alkali and waste sulfite lignin liquors and lignin liquors derived as effluents from other industrial processes are used as raw materials from which valuable condensable thermoplastic polymers, cross-linked polymers, and insolubilized polymers and resin forming intermediates are recovered. The intermediates isolated or recovered from the lignin liquors are capable of reacting still further to form thermoplastic and thermosetting polymers. They may be reacted with protein type polymers and with cellulosic and other resin polymers and may be cross-linked with these polymers. The organic reactive and polymerizable materials obtained from the lignin liquors are condensable with aldehyde and other reactive groups to provide the alkali-dispersible adhesive products of the present invention.

It is a principal object of the invention to provide improved lignin resins derived from effluent or from waste sulfite and waste alkali lignin liquors, which resins are highly reactive and which are cross-linked with a wide variety of cellulosic, protein, and other polymeric or polymerizable material to produce alkali-dispersible products thus effectuating the ultimate reclaiming of high quality cellulosic fibers for reuse in paper fabricating processes.

Another important object of the invention is to provide a new and economical process for the utilization of alkali and spent sulfite lignin liquors whereby valuable condensable lignin chemicals and natural polymers are cross-linked and polymerized with amines, phenols, aldehydes and other compounds to provide polymers and copolymers which may in turn be reacted with a wide variety of resins, elastomers, and polymers to produce alkali-dispersible end products.

Another important object of the invention is to provide a catalyst to facilitate the neutralization of the sulfite lignin liquors and to activate the lignin components to promote the copolymerization of the naturally occurring lignin polymeric and polymerizable materials with resins, elastomers, and polymers, etc.

Another object of the present invention is to provide an improved adhesive composition specifically adapted for use with paper and like cellulosic materials which adhesive includes a lignin, a solvent, a viscosity reducer and an adhesive agent which cooperates with the lignin constituent to provide unique adhesive properties.

Another object of the present invention is to provide a new and improved lignin base adhesive specifically adapted for use with cellulosic substrates (paper, etc.) which lignin base adhesive composition exhibits advantageous hydrogen bonding to the cellulosic substrate.

Another object of the present invention is to provide a thermally responsive adhesive which may be applied by printing techniques, which will bond to but not penetrate cellulosic material, which will not add to the overall thickness of the substrate to which it is applied, and which is alkali-dispersible.

Another object of the present invention is to provide an improved method of "drying" a printed or coated web.

A related important object is an improved method of reactivating adhesives and effectuating bonding and fabrication in bookbinding operations.

The importance of this invention and the advantages afforded thereby will be more fully appreciated from the detailed description and claims which follow. While there is no intention to be limited in any manner by any theory expressed herein, theories and mechanisms have been and will be proposed from time to time in the description of the invention and in the explanation of the reactions and phenomena involved.

In preferred embodiments of the invention the polymers and resins contained in the alkali and sulfite base lignin waste liquors are conduced with aldehydes. One step of the method of carrying out the invention is to neutralize the lignin sulfonic acid groups of the sulfite lignin with ammonia or with urea. The ammonia or the urea-neutralized lignin sulfonic acid compounds react during crosslinking with formaldehyde to provide superior water-resistant coatings which are alkali-dispersible in fiber reclaiming processes. Both ammonia and urea contribute to the ease of polymerization of the lignin natural monomers and polymers, and the ammonia and the urea are important, in addition, since they promote the formation of strong hydrogen bonds when the products of the invention are printed or are coated on hydrogen-bonded paper, with the strongly hydrogen bonded components of the invention.

In a very important embodiment of the present invention the lignin solution is neutralized with alkali such as sodium hydroxide or with potassium hydroxide or with other strong alkali metal hydroxides or with alkaline earth metal hydroxide, or with organic bases, and a special metallic oxide catalyst is used in combination with the alkali. The catalyst, which is preferably zinc oxide, is an important element in minimizing the degradation of the lignin polymers during condensation reactions and is believed to have the desirable effect of modifying the lignin sulfonic acid groups so that amino-group-containing substances with which the lignin is reacted are rendered capable of further condensation with aldehydes. This effect may be due to activation of one or of both hydrogens of the amino groups involved.

The adhesive compositions of the invention have the unique property of lying on the paper stock, or other surfaces to which they are applied and bonding firmly without penetrating into the substrate. This feature simplifies cellulose stock reclaiming operations. It also makes practical the use of lighter weight printing stock, since undesirable penetration is avoided. The lignin base adhesives of the invention may be applied onto the surface of each sheet, near the edge to be bound, by ordinary coating or printing techniques to form strong adhesive bonds between sheets. Their novel properties also make possible deposit and application without increasing substantially the overall thickness of the final "printed" or coated sheet. The adhesive compositions of the invention are thermo-responsive and susceptible to heat activation to become tacky, and sheets with adhesive-coated borders may be "glued" in binding operations by merely supplying heat and pressure to the coated faces or borders of the collated stacked sheets or pages after completion of the printing process. The printing of the copy on the stock and the application of the adhesives of the invention to the borders of the stock may be and preferably are carried out at the same time in a single "printing" operation or pass. Some of the adhesive compositions are rendered electro-responsive so that induction and high frequency heating techniques may be used in actuating and effecting the thermo-responsitivity of the adhesive preparations.

In other preferred embodiments of the present invention the adhesives are of a delayed-tack type and may be "printed" and later reactivated, as, for example, by heat, during book or catalog assembly. However, the adhesives may also be formulated for more conventional use with coating machines, glue pots, curtain coaters, and gravure coaters. In another preferred procedure, controlled "spot" or fine-line application of the adhesives is achieved by using hypodermic needles. This method finds particular utility in the fabrication of business form assemblies of the "snapout" type.

A preferred method of applying the adhesives of the invention in bookmaking is to coat the sheets, marginally, with the adhesive, collate and clamp the sheets, and then dip the composite assembly to submerge substantially all of the coated portion in molten metal to activate the adhesive and to effectuate a permanent bond. The molten metal is preferably in the temperature range of from about 150° F. to about 800° F. This metal-dipping technique is highly effective because of the excellent heat transfer achieved and because of the absence of any absorption of the heating medium into the paper. Other methods of heating the glue-coated pages, as, for example, by radiation, gas, or electrical means may be used. When heat-activated, the adhesives of the invention, have sufficient "tack-delay" (tack retention) to permit necessary handling and related operations.

The hot metal dip technique of the present invention, which finds utility not only as a superior method of bonding adhesive coated sheets and as a preferred procedure for reactivating the adhesive compositions of the invention, is, in the practice of this invention, also recommended as a means for effectuating a very rapid drying of inks and other imprinted or coated material applied to a web. For example, a web of paper (or other material), printed with any heat responsive ink or coating, may be passed rapidly through a bath of molten metal to "dry" the ink or coating. The temperature of the molten metal bath may be any preferred temperature but is preferably in the range of about 150° F. to about 800° F. The contact time selected and the nature of the coating and of the web material will dictate or govern the temperature in any given instance. Short contact times at higher temperature may, in general, be equated to longer times at lower temperatures. Upon a consideration of the present disclosure, the determination of a particular time and temperature combination is within the competence of those skilled in the art.

Another important method of using the adhesives of the invention is to apply the adhesive to the backbone of the book, at room temperature, and then to subject the backbone plus the contacting book cover to heat, e.g. radiated heat such as from heat lamps. The adhesive is heated, preferably to about 180° to 200° F., but within the range of about 150° F. to 250° F. for about ten seconds to cross-link the materials of the adhesive and to set the adhesive.

Spent or waste sulfite lignins, alkali lignin liquors, and lignin products derived from other sources such as spent sulfite liquor yeast culture preparations find utility in the practice of the present invention. Spent sulfite lignin liquor is an effluent from the pressure digestion of woods and similar vegetable materials in commercial paper-making processes. In such paper-making digestion processes, about 50% of the solids of the raw wood input is recovered in the form of cellulose pulp. The remaining 50% solids of the starting material feed is found in the waste sulfite liquor effluent from the pulp digesters. The paper-making by-product spent sulfite liquors contain lignin and varying amounts of a complex mixture of wood sugars, such as xylose, glucose, fructose, etc., some of which are sulfonated, some of which are reduced and which are in various stages of hydrolysis. In addition to these and other organic components, the lignin sulfite liquor contains appreciable quantities of inorganic bisulfites and free sulfurous acid. The bisulfites may be alkali metal salts, or alkaline earth metal salts, particularly salts of calcium.

Sulfite spent liquors from which the sugars have been partially or completely removed by any of the usual methods, and which thus contain primarily lignin sulfonates, are also suitable for use as starting products in the preparation of the compositions of this invention.

In addition to the acid lignin sulfite liquors and the lignin sulfite yeast culture effluents (e.g. Toranil, a sulfite lignin purified or wood sugars, Lake States Yeast and Chemical Division of St. Regis Paper Co.) which find utility as raw material sources for the products of the present invention, the alkali lignins from the black liquor of the alkaline processes are also useful. These lignings are by-products of the pressure digestion of wood and related cellulose materials. The waste effluents from the digesters ordinarily contain about 50% of the original solids of the raw material used. This alkali lignin also contains complex mixtures of sugars, such as xylose, glucose, and fructose. Some of these are sulfonated, some are reduced, and the products are in various stages of hydrolysis. Before purification, the alkali lignin contains large quantities of alkali metal salts and free alkali, the pH of the solution being ordinarily in the range of about 8 to about 11.

Sulfonated alkali lignins suitable as reactants in the preparation of the products of the present invention may be produced by precipitating alkali lignin (contained in alkaline spent pulping liquor) by means of a mineral acid, isolating the precipitated lignin material and treating it with either sulfurous acid or a water-soluble bisulfite until a water-soluble sulfonated lignin material is formed, all as is well known in the relevant art. The sulfonic acid groups of lignin react with proteins and with related chemicals to form insoluble complexes useful in the practice of this invention. It is a most important feature of the present invention that both the lignin adhesives and the lignin inks are readily dispersible in alkali, thus facilitating the ultimate reclaiming of the paper stock for further use.

Sulfite lignin products useful in the practice of the present invention include lignosulfonic acids which are separated from sulfite pulping liquor by electrodialysis. In this procedure, the catholyte consists of cooking acid salts which, depending upon the alkali used, may be sodium, magnesium, ammonium, or calcium salts, or acid salts. The anolyte consists of hexose and pentose sugars, acetic acid and other low molecular weight materials, depending on the pore size of the membrane used in the electrodialysis. The free lignosulfonic acids recovered from the electrolysis are extremely tacky substances. They can be polymerized to products of molecular weight of 150,000 or higher. The polymers are highly reactive and find use as reactants to produce the improved products of the invention.

The alkali lignins, particularly those derived from Southern woods, include naturally occurring polymer compounds. These are believed to include a series of closely linked benzene, pyran and furan rings carrying such substituents as methoxy, hydroxyl, and phenolic groups and other groups which can participate in cross-linking reactions with other polymeric and polymerizable materials.

The composition of the spent sulfite and alkali lignin liquors is, as may be expected, somewhat variable depending upon the cooking conditions and the fibrous material used. However, the content of lignin sulfonate ordinarily ranges between about 40 and 70 percent by weight (dry basis). A product of this type is a sodium base or ammonium base sulfite spent liquor manufactured and sold by Crown Zellerbach Corporation, San Francisco, Calif., under the trademark Orzan in liquid form in a wide range of concentrations, as well as in the form of a dry powder.

In some instances, it is important that very light-colored adhesives be obtained. Under these conditions, it may be desirable to bleach or otherwise decolorize the lignin raw materials. A suitable procedure is the following:

To about 2,000 grams of sulfite lignin containing about 50% solids and having a brown color add sufficient alkali to bring the pH to about 7. Add a solution of about 20 grams of potassium permanganate in about 200 ml. of water to the neutralized lignin, at room temperature. Upon completion of the permanganate oxidation, add 40 grams of sodium bisulfite ($NaHSO_3$) to provide a light-colored lignin product.

In accordance with the present invention, it has been discovered that the neutralization of sulfite lignin liquors with alkali containing a catalyst such as zinc oxide and then further alkalizing the lignin liquor wtih ammonia, triethanolamine, or with urea has the effect of producing reactive nitrogen-containing groups in proteins, terpene hydrocarbon alkali soluble resins and other resins and polymers of the type solubilized by ammonia, and renders these materials capable of condensing readily with aldehydes or phenols to form useful thermoplastic adhesives.

A markedly improved reaction system is achieved by incorporating with the alkali used to neutralize the lignin solution and the sulfonic acid groups and the carboxylic acid groups of the lignin acids a catalytic material preferably of the zinc oxide type. It has been found that in this particular type of system, and under these conditions, amino groups of protein-type compounds are rendered more reactive and subsequent amino-aldehyde polymerization reactions are facilitated. The activation of the amino group is believed to be due to the activation of one or more of the hydrogens of the group. Amines of the type which find utility in the practice of the present invention include aliphatic, aromatic, and heterocylic primary and secondary amines. Other reactive nitrogen compounds include amides, amines, amino-triazines, and the thio counterparts of any such groups of substances. Typical among representative compounds are urea, dimethylol urea, dimethylol ethylene urea, biuret, guanidine, dicyandiamide, dicyandiamidine, melamine, and others. Aromatic and substituted aromatic amines such as aniline, phenylenediamines, napththylamines benzidene, 4-amino diphenyl amine, and homologues of aniline such as touidines and xylidines, also find utility in the practice of the invention.

A neutralization procedure for lignin solutions using alkali and zinc oxide is shown below:

USE OF ZnO IN NEUTRALIZATION REACTION (1) 33.2 gallons 55% Norlig (Lignin product of the Marathon Paper Company).
(2) Add 4.2 gals. water to bring solids to 50%.
(3) Add 2200 cc. of neutralizing solutions.[1]
(4) pH after reaction—7.3.
(5) React 2 hrs. at about 180° F. and add 150 cc. of preservative (Dowicide).

Final Product.—Solids Content 49.6%, pH=7.1.

[1] Neutralizing solution:

| | G. |
|---|---|
| Water | 2000 |
| ZnO | 560 |
| NaOH | 1430 |

The zinc oxide is believed to aid in preventing the precipitation of sulfur when the lignin sulfite liquors are neutralized. Thus, in a preferred embodiment of the invention the acid spent sulfite lignin liquors are neutralized to a pH of about 7 with sodium hydroxide containing a zinc oxide catalyst. Further alkalization of the sulfite lignin liquors is then carried out with ammonia or urea and the pH of the final liquor is adjusted to neutral or to a slightly alkaline pH, for example, a pH in the range of about 7 to about 9. The lignin solution, so prepared, contains a substantial fraction of compounds containing active nitrogen groupings and will react with phenols and aldehydes, etc. to produce condensation products. Specific applications embodying the neutralization using both alkali and a catalyst are shown in the examples.

Many different aldehydes and aldehyde-group-containing compounds may be used as reactants in condensation reactions with the materials obtained from the lignins. Monomethylol methyl hydantoin is a preferred aldehyde for condensation with the lignin resin polymers. In addition, many other compounds containing an aldehyde group may be used. Typical examples include furfural, glyoxal, formaldehyde, acetaldehyde, butyraldehyde, acrolein, crotonaldehyde, benzaldehyde, dialdehyde starch, paraformaldehyde and formalin, etc.

Additional organic compounds and materials with which the lignin-amine reaction products of the present invention may be polymerized or combined are alkali-soluble cellulose ethers, carboxymethyl cellulose, polyvinyl alcohol, hydroxyethyl cellulose, polyethylene oxide polymers, carboxylated polyvinyl acetate, polyvinyl acetate, zein, polyvinyl pyrrolidione, extracted animal proteins (hide glue) extracted fish proteins (fish glue, e.g. Collagen) starch, deacetylated derivatives of N-acetyl D-glucosamine, dextrines, casein, soya protein, wheat gluten protein, blood albumin, egg albumin, extracted animal blood, peanut protein, seaweed alginates, lecithin, amylopectin starch, monomethylol dimethyl hydantoin, bituminous coal by-products containing mixed natural humic acid polymers, quar gum, dialdehyde starch, Gantrez (General Aniline Vinyl-Maleic anhydride polymer), etherized cellulose, etherized cellulose carbohydrate polymers, etc. Additional polymeric materials such as cellulose and protein polymers may be used as modifiers and to promote and provide cross-linking reactions.

The lignin polymers of the invention co-react with carboxymethyl cellulose or with hydroxyethyl cellulose to produce polymers of high molecular weight. In this reaction the lignin spent sulfite liquor is neutralized with sodium hydroxide containing zinc oxide as a catalyst to bring the pH of the solution to about 7 to about 9. The carboxymethyl cellulose or hydroxyethyl cellulose is solubilized separately in water containing a catalyst consisting of ammonium chloride and an aldehyde. The amonium chloride reacts specifically with the carbonyl groups of the lignin and cellulose to provide configurations such as those resulting in the reaction of amino groups by condensation with aldehydes. The cellulosic product containing the ammonium chloride catalyst and the aldehyde is then added to the neutralized lignin spent sulfite liquor and the cellulosic and the lignin polymers are condensed in subsequent reactions.

An important feature of the present invention is that there is provided a new and economical reclaiming process for removal of these lignin adhesives from paper. In this connection, it is important to note that in my copending application Ser. No. 536,564, filed Mar. 14, 1966, and entitled, "Lignin-Base Colorants and Products Produced Therewith," I disclose an ink which can be readily bleached and removed in the same reclamation process. A typical procedure is the following:

Catalogs, telephone directories, etc., which have been bound using the lignin base adhesives of this invention and which are to be reclaimed are introduced into a blender or chopper containing the following materials:

| | Parts |
|---|---|
| Water | 4,000 |
| Aerosol AT (wetting agent or surfactant) | 10 |
| Sodium hydroxide | 10 |
| Bleaching agent, e.g. hypochlorite, etc. | 30 |

A pulp blend is produced and this is then washed, filtered, and dried. An important advantage of this process, using paper in which the adhesives used are the lignin base adhesives of the invention, is that the pulp fibers are recovered free of all adhesive to provide a high quality reusable pulp. The lignin has been found to act as a suspending agent or colloid stabilizer and facilitates the removal of fillers from the fibers, these being separated during filtration of the pulp and discarded with the effluent.

This invention is further described with reference to the following additional illustrative examples which are indicative of typical representative compositions and processes for manufacture of the same and are given for the purpose of illustrating the invention. They are, nevertheless, not intended to limit the ambit of the invention or the generally broad scope of the invention to strict accordance therewith. All of the reactant proportions in the examples are expressed in parts by weight, except where otherwise indicated.

The improved lignin adhesives of the invention are suitable for application by many techniques, as, for example, they may be used in glue pots, glue fountains, glue or adhesive coaters, or in delayed tack applications. In their preferred embodiments, the lignin adhesives of this invention are directed principally to delayed tack applications.

Example 1

The adhesive of Example 1 is a product useful both as a glue pot adhesive and as a delayed tack adhesive or printing adhesive.

PART I

| | Grams |
|---|---|
| Lignin liquor, 50% solids, pH=3.5 (Lake States Yeast Co.), wood sugar free, and neutralized to pH=7 with ammonium hydroxide | 1,000 |
| Water (Methanol or ethanol can replace the water, or part of the water, e.g. 300 ml. water, 700 ml. alcohol) | 1,000 |
| Gantrez AN–149 (Polymethyl vinyl ether, 1-maleic anhydride, General Aniline and Film Co.) | 40 |
| Dicyandiamide | 15 |
| Triethanolamine (TEA) | 15 |

Procedure.—The lignin neutralized black liquor, water, triethanolamine, and the dicyandiamide were introduced into a reaction flask equipped with an agitator, a heater, and a condenser. The mixture was heated and maintained at about 195° F. for ten minutes. The mixture was agitated vigorously while adding the Gantrez AN–149 resin. Upon solution of the resin, the reaction mixture was cooled.

PART II

| | Grams |
|---|---|
| Lignin liquor, 50% solids, pH=3.5 (Lake States Yeast Co.), wood sugar free and neutralized to pH=7 with ammonium hydroxide | 1,000 |
| Water | 1,000 |
| Triethanolamine (TEA) | 15 |
| Dicyandiamide | 15 |
| Polyvinylpyrrolidone K–90 (General Aniline and Film Co.) | 80 |

Procedure.—The neutralized lignin black liquor, water, amine, and the dicyandiamide were introduced into a reaction flask equipped with an agitator, a heater, and a condenser. The mixture was heated and maintained at about 195° F. for about ten minutes. The mixture was agitated vigorously and the PVP–K–90 polymer added during the agitation. Upon solution, the reaction mixture was cooled.

The adhesive is prepared by mixing equal proportions of Part I and Part II above.

The lignin polymer, polyvinylpyrrolidone polymer and Gantrez AN polymer are polyelectrolyte type polymers and insolubilization is instant when PVP and Gantrez AN polymers are intermixed. The presence of a volatile amine and the lignin polymer "stops" insolubilization or crosslinking of the PVP and the Gantrez AN polymers and allows these polymers to be coated wet to a substrate. Upon activation, e.g. by application of heat, the amine is volatized and the lignin, PVP and Gantrez polymers crosslink to form an adhesive coating having high fiber tear bond properties.

The PVP may be replaced with other cross-linking agents such as dimethyl hexynediol, 1,4-butanediol, ethylene glycol, urea and ammonium hydroxide, glycerine, polyvinyl alcohol, hydroxyethyl cellulose. Ethanolamine and ethylene diamine can replace triethanolamine.

The Gantrez AN is believed to cross-link via primary valence bonds with polyfunctional chemicals, including polyhydroxy compounds and polyamines. Because of the high parameter of hydrogen bonding properties of lignin, the lignin adhesive coating system becomes water-dispersible in alkaline paper depulping and de-inking processes.

Note: The ammonium hydroxyl neutralized lignin liquor may be replaced with lignin liquor neutralized with NaOH and zinc oxide.

The following formulation comprises another example of the adhesives of this invention. The product obtained is useful as a pot-type adhesive.

Example 2

| | Grams |
|---|---|
| Lignin black liquor, 50% solids, pH=3.5 (neutralized to pH=7 with NaOH and zinc oxide.) | 1,000 |
| Water | 1,000 |
| Urea | 30 |
| Ammonia | 60 |
| Hydroxyethyl cellulose (carboxymethyl cellulose may be substituted) | 100 |
| Ammonium chloride | 20 |
| Formaldehyde | 30 |

Procedure.—The water, urea, and ammonia were introduced into a reaction flask equipped with an agitator, a heater, and a condenser. The temperature of the mixture was raised to 190° F. and the hydroxyethyl cellulose then added during vigorous agitation. The neutralized lignin was then added and the reaction mixture agitated for about ten minutes longer. Finally, the formaldehyde and the ammonium chloride were added and the temperature raised to about 215° F.–220° F. to condense the polymers. After a reaction period of about 30 minutes the resulting clear solution was cooled.

Lignin adhesives particularly suitable for glue pot applications are described in Examples 3, 4 and 5 below:

Example 3

| | Parts |
|---|---|
| Dextrin | 47 |
| Norlig, 50% solids (neutralized to a pH of 7 with NaOH plus ZnO) | 47 |
| Sorbitol (plasticizer) | 4.8 |
| Sodium X-naphthalene sulfonic acid (to prevent gelling and reduce viscosity) | 1.0 |

Procedure.—The Norlig lignin, sorbitol, and the sodium alpha naphthalene sulfonic acid were introduced into a reactor equipped with an agitator, a heater, and condenser. If desired, a suitable wetting agent such as tergitol anionic may be combined with the above mentioned ingredients in the reactor. This mixture was heated for one hour at 200° F. The dextrin was added and the resulting mixture was heated at 210° F. for one hour and the adhesive composition then cooled.

Water may be added, as required, to adjust the viscosity and the fluidity.

Note: Variations of the above formulation are obtained by substitutions, e.g., dicyandiamide for alpha naphthalene sulfonic acid, and sucrose monomyristate or sucrose dipalmitate for sorbitol. Potassium or sodium silicate may be added to the formulation to produce higher bond strengths to corrugated hard fiber board.

Example 4

A lignin base adhesive using a protein-type reactant is described in this example. The reaction involved is one in which urea-formaldehyde condensates react with lignin to form water-soluble products (condensates) which in turn react with collagen through hydrogen bonding between —CO—NH— groups present in both the lignin-urea-formaldehyde condensates collagen, forming cross-linked polymers. The molecular weight and the degree of refinement of the collagen affect the extent of cross-linking and the insolubilization with the lignin polymers.

| | Grams |
|---|---|
| Lignin (acid lignin sulfonic acids, e.g. Norlig), pH=3.5 | 4,000 |
| Collagen (animal or fish protein) | 800 |
| Dicyandiamide (cyanoguanidine—the dimer of cyanimide) | 50 |
| Formaldehyde | 40 |
| Urea | 60 |
| Ammonium hydroxide (tertiary amine bases, e.g. triethanolamine, morpholine, etc. may be used) | 40 |

Procedure.—The acid lignin (Norlig) liquor was introduced into a reactor equipped with an agitator, a heater, and a condenser. Ammonium hydroxide was added to bring the pH of the lignin to 7. The neutralized lignin was heated to about 190° F. and the dicyandiamide, urea, and formaldehyde added maintaining the reaction mixture at 215° F.–220° F. After one hour the temperature was reduced to 210° F. and the Collagen added, maintaining the mixture at reaction mixture temperature for one hour and then cooling the resulting adhesive product.

The finished adhesive may be diluted with water or with a solvent having a low parameter of hydrogen bonding properties to reduce the viscosity or to fluidize the product. The adhesive is suitable for pot and for "printing" application.

The formaldehyde may be replaced with "Sunstar" dialdehyde starch—90% dialdehyde content (Miles Laboratories, Inc.).

Example 5

| | Grams |
|---|---|
| Lignin (Norlig, Marathon, neutralized to pH=7 with NaOH and ZnO) | 4,000 |
| Protein of vegetable source, e.g. zein, casein, soya, wheat gluten) | 1,000 |
| Polyhydric alcohol (glycerin, sorbitol, diethylene glycol, etc.) | 1,000 |
| Ammonia | 80 |
| Urea | 40 |
| Formaldehyde | 100 |
| Dicyandiamide | 40 |
| Water | 1,000 |

Procedure.—The neutralized lignin, ammonia, urea, formaldehyde and dicyandiamide were introduced into a reaction vessel equipped with an agitator, a heater, and a condenser. The temperature was held at 215° F. for one hour, the polyhydric alcohol then being added, and the reaction continued for one-half hour longer.

The protein was solubilized in water to form a colloidal dispersion and this dispersion was added to the lignin fraction. The mixture was condensed at 212° F. for one-half hour to provide a polymer having a propensity to cross-link when applied on a substrate, as an adhesive.

The finished adhesive polymer may be diluted with water, or with an organic solvent having minimal hydrogen bonding properties.

Examples of other aldehyde-group-containing compounds which may be used in place of or in conjunction with formaldehyde include furfural, glyoxal, acetaldehyde, butyraldehyde, acrolein, crotonaldehyde, benzaldehyde, dialdehyde, starch, para-formaldehyde, formalin, etc.

Example 6

| | Grams |
|---|---|
| Toranil A (50% solution of desugared lignin) pH=7 (neutralized with ammonium hydroxide or with other alkali) | 1,000 |
| Water | 600 |
| Ammonium hydroxide | 50 |
| Ethyl alcohol | 50 |
| SR-83 Terpene—phenol resin, alkali soluble (Schnectady Varnish Co.) | 200 |
| Hercoflex 900, polymeric rosin plasticizer (Hercules Powder Co.) | 100 |

Procedure.—The lignin, water, ammonium hydroxide, and ethyl alcohol were introduced into a reaction vessel equipped with an agitator, a heater, and a condenser and the mixture heated at 190° F. for one hour. The terpene-phenol resin and the Hercoflex 900 were then added, and after one hour the reaction mixture was cooled.

The preparation of an aqueous delayed-tack adhesive dispersion is described in Example 7.

Example 7

PART I.—LIGNIN RESIN AMINE DISPERSANT

| | Grams |
|---|---|
| Lignin spent sulfite liquor, 50% solids neutralized to pH=7 with NaOH containing a ZnO catalyst (alternatively, ammonium hydroxide may be used) | 3,000 |
| Nonyl phenol or nonyl phenol still bottoms | 900 |
| 2-amino, 2-methyl, 1-propanol | 900 |
| Polypale resin (Hercules) or fossil resin | 900 |

The above ingredients were combined and reacted at 210° F. for one hour to provide a clear solution.

PART II

| | Grams |
|---|---|
| Diphenyl phthalate | 52.5 |
| Nevillac Hard Resin (Neville Chemical Co.) | 30 |
| Part I amine dispersant | 198 |
| Polyvinylpyrrolidone-vinyl acetate copolymer W-46 latex (Antara Division, General Analine & Film Co.) | 43.5 |

The above ingredients were reacted in accordance with the following procedure:

The amine dispersant was introduced into a jacketed dispersion mill (equipped for cooling) and the dispersion held at 30°-40° F. The diphenyl phthalate and the Nevillac resin were then added and the composition milled to a fine dispersion. The polyvinylpyrrolidone-vinyl acetate copolymer was added to the amine dispersant, at room temperature.

The product, tested for fineness of grind was found to be equivalent to 7 on the Hedgeman scale.

Example 8 describes the preparation of an oleophilic forming lignin copolymer adhesive dispersion prepared from a hydrophilic lignin polymer.

Example 8

PART I.—LIGNIN AMINE DISPERSION

| | Grams |
|---|---|
| Indulin AT (Purified oleophilic alkali lignin powder) West Virginia Pulp & Paper Co. | 1,000 |
| Dimethyl formamide | 4,000 |
| Nonylphenol (or nonyl phenol still bottoms) | 300 |
| Morpholine (or 2-amino, 2-methyl, 1-propanol) | 60 |

Procedure.—The dimethyl formamide, nonyl phenol, and the amine were introduced into a reaction vessel equipped with an agitator, a heater, and a condenser and the mixture heated at 190° F. The lignin was added and the temperature maintained at 190° F. for one hour until a clear solution formed. The solution was then cooled.

PART II

| | Grams |
|---|---|
| The above dispersion | 5,360 |
| Versamid 940, polyamide resin (General Mills) | 700 |
| Santicizer 9 (Monsanto solid-type plasticizer) | 300 |

Procedure.—The lignin dispersion was introduced into a jacketed vessel equipped for cooling and heating and fitted with a dispersion shear mill. While maintaining the temperature at 30°-40° F., the solid resin and solid plasticizer were added and the mixture milled to a microparticle size.

The final adhesive product is of the type which may be coated and dried on a substrate and which can later be activated by heat.

Any suitable solvent, which does not solvate the resin polymer or the plasticizer polymer, may be used to control the viscosity and the fluidity of the final adhesive.

Another formulation of an aqueous, delayed-tack type adhesive having utility both as a precoated adhesive (which can be applied to a substrate) and as an adhesive which may be applied from an applicator (coating tank or glue pot) to the backbone of a book and to its cover is described in Example 9.

Example 9

| | Grams |
|---|---|
| Toranil A (Lake States Yeast Co., Div. of St. Regis Paper Co.) 50% solids, a lignin sulfite lignin by-product of yeast culture | 750 |
| Water | 250 |
| Triethanolamine (TEA) | 15 |
| Dicyandiamide | 15 |
| Gelva PVA Emulsion S-55-R (Shawinigan Resin Corp.), an emulsion dispersion of polyvinyl acetate monomer in water. (This material may be replaced by Ammoniated Natural Rubber Latex, e.g., S-4 Natural Latex, Firestone Rubber Co.) | 1,000 |
| Hercoflex 900 (Hercules Powder Co.) polymeric rosin plasticizer. (Dibutyl phthalate, or Hercolyn, a rosin polymeric plasticizer may be substituted for the Hercoflex 900) | 200 |

Procedure.—The Toranil A, water, TEA, and the dicyandiamide were introduced into a reactor equipped with an agitator, a heater, and a condenser and heated at about 212° F. for one hour and then cooled to 70° F. The Gelva PVA Emulsion S-55-R was added, during violent agitation, which was maintained for about ten minutes. The Hercoflex 900 was then added during violent agitation, which was maintained for about ten minutes.

The resultant adhesive product, applied to the backbone of a book and to the cover of a book, etc. provides a strong highly cohesive bond. An important feature and advantage of this, and the other adhesives and of the ink vehicles, of the present invention is that the products exhibit excellent dispersibility in alkaline de-inking and depulping systems for pulp recovery and reclaiming. Thus, the finished book, and the trimming waste as well, are subject to ready reclaiming. In addition to providing exceptional cohesive strength in the PVA formulation, the lignin acts as a colloidal agent during dispersion of the pulp during reclaiming.

While the invention has been described and illustrated by way of preferred embodiments thereof, it will be apparent to those skilled in the art that variations and modifications may be made without departing from the scope of the present invention as defined by the appended claims.

I claim:
1. A lignin base alkali-dispersible adhesive comprising the reaction product obtained by chemically reacting
   (A) 1000 parts by weight of neutralized lignin black liquor containing about 50 percent solids by weight, about 15 parts by weight of triethanolamine, about 15 parts by weight of dicyandiamide at about 195° F. for about 10 minutes, adding about 40 parts by weight of polymethyl vinyl ether, 1-maleic anhydride in about 1000 parts by weight of solvent; and
   (B) in a separate vessel reacting 1000 parts by weight of neutralized lignin black liquor containing about 50 percent solids by weight, about 15 parts by weight of triethanolamine, about 15 parts by weight of dicyandiamide at about 195° F. for about 10 minutes, adding about 80 parts by weight of polyvinylpyrrolidone; and
   (C) mixing equal proportions of (A) and (B) to provide an alkali-dispersible adhesive suitable for both pot and delayed-tack applications.

2. A lignin base alkali-dispersible adhesive comprising the reaction product obtained by chemically reacting about 30 parts by weight of urea, about 60 parts by weight of ammonia at about 190° F. for about 10 minutes in about 1000 parts by weight of solvent; adding about 100 parts by weight of hydroxyethyl cellulose, about 1000 parts by weight of lignin black liquor containing about 50 percent solids and neutralized to pH=7 with sodium hydroxide containing zinc oxide as a catalyst, maintaining the temperature at about 190° F. for an additional 10 minutes, adding about 30 parts by weight of formaldehyde and about 20 parts by weight of ammonium chloride, raising the temperature to about 220° F. and continuing the reaction for about 30 minutes to provide a solution of an adhesive suitable for both pot and delayed-tack applications.

3. Lignin base alkali-dispersible adhesive comprises the reaction product obtained by chemically reacting 1000 parts by weight of desugared lignin containing about 50 percent solids by weight and neutralized with alkali to pH of 7, about 600 parts by weight of solvent, heating at about 190° F. for one hour, adding about 200 parts by weight of alkali-soluble terpene-phenol resin and about 100 parts by weight of polymeric rosin plasticizer, and continuing heating for about one hour to provide an adhesive suitable for both pot and printing applications.

References Cited
UNITED STATES PATENTS

| | | | |
|---|---|---|---|
| 3,141,873 | 7/1964 | Goss | 260—17.5 |
| 2,760,943 | 8/1956 | Sohn | 106—123 |
| 2,579,483 | 12/1951 | Fenn | 260—17.5 |
| 2,156,160 | 4/1939 | Olsen | 260—17.5 |

FOREIGN PATENTS

| | | |
|---|---|---|
| 552,336 | 7/1954 | Canada. |

OTHER REFERENCES
Skeist: "Handbook of Adhesives," 1964, 7P 968 S.5 pp. 478–480, copy in group 146.

JULIUS FROME, *Primary Examiner.*

T. MORRIS, *Assistant Examiner.*